Dec. 5, 1944.       H. M. HUGE       2,364,532
COMMON CORE FREQUENCY CHANGER
Filed May 6, 1943

INVENTOR.
HENRY MARTIN HUGE
BY Woodling and Krost
ATTORNEYS.

Patented Dec. 5, 1944

2,364,532

UNITED STATES PATENT OFFICE 2,364,532

COMMON CORE FREQUENCY CHANGER

Henry M. Huge, Lorain, Ohio, assignor of one-half to Closman P. Stocker and one-half to E. M. Heavens Application May 6, 1943, Serial No. 485,834

15 Claims. (Cl. 172—281)

This invention relates to frequency changers and in particular to a frequency-changing transformer capable of generating subharmonics of the input frequency.

It is an object of this invention to generate subharmonics of the input frequency in a static frequency changer.

Another object of this invention is to produce a frequency-changing transformer for the generation of subharmonics.

Another object of this invention is to produce a subharmonic generator of high efficiency and stability.

Still another object of this invention is to automatically start subharmonic oscillations by the use of a relay.

Figure 1:
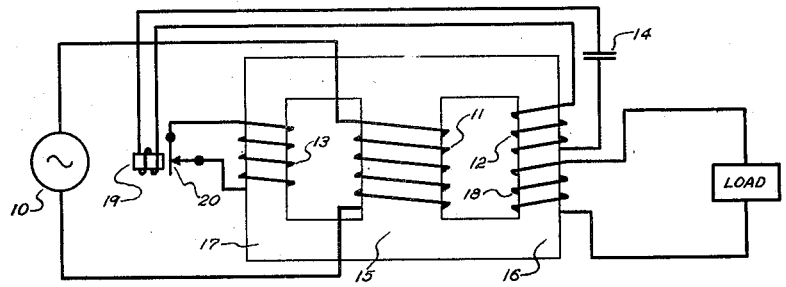
Figure 2:
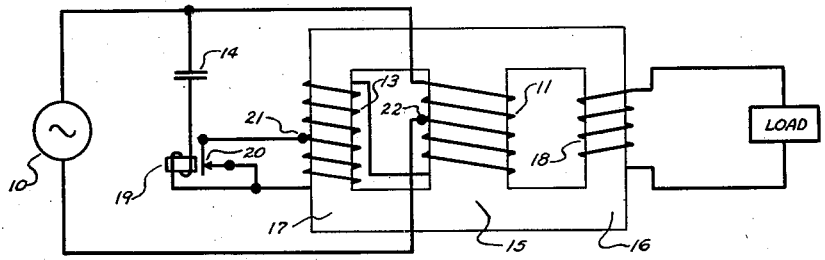
Figure 3:
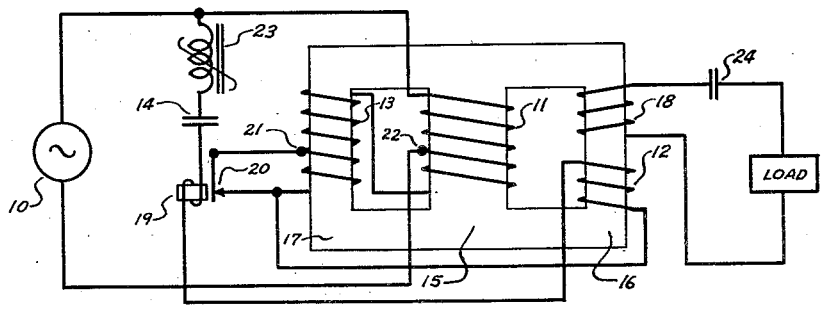

Other objects and a better understanding of my invention may be had by referring to the following specification and claims in connection with the accompanying drawing, in which Figure 1 shows diagrammatically a subharmonic generator made according to my invention, with a magnetic core having two saturable flux paths, Figure 2 is a modification of the arrangement of Figure 1 showing an alternative winding arrangement, and Figure 3 is a modification of the arrangement of Figure 2 showing another winding arrangement, an overload protection capacitor, and also a saturable inductance for introducing harmonics in the subharmonic output voltage.

With more particular reference to Figure 1, there is shown a magnetic core having two saturable magnetic flux paths 16 and 17 with a common member 15. Winding 11 on the common member 15 is energized from the source of alternating current 10, magnetizing the core at the frequency of source 10.

When the power is first applied, the normally closed contacts 20 on relay 19 short winding 13 which is on core section 17, thereby driving most of the flux through section 16. The voltage thus induced in winding 12 on section 16 is applied to capacitor 14 through the winding of relay 19. The resultant current flow operates relay 19, opening the contacts 20 and allowing flux to flow through core member 17.

The charge on capacitor 14 when relay 19 operates, flows away through winding 12, magnetizing core sections 16 and 17, without appreciably magnetizing section 15, since its flux is determined by the voltage of source 10. The superposition of the flux produced by the transient discharge of capacitor 14 on the flux produced by energy from source 10 saturates the magnetic core, particularly section 17, and causes a transfer of energy which recharges capacitor 14 oppositely to its initial charge. Capacitor 14 then discharges once more and the cycle of operation is repeated, holding relay 19 in the operated position as long as the oscillations continue. The rate at which this cycle of operation is repeated depends largely on the natural frequency of the circuit of capacitor 14 and winding 12. In general the oscillations thus produced are of a frequency subharmonically related to the frequency of source 10. The frequency most easily produced is equal to one-third the frequency of source 10, but other subharmonics of the frequency of source 10 can also be produced.

Capacitor 14 across winding 12 has a low impedance at the frequency of source 10 and therefore most of the flux from section 15 is caused to flow through section 17. Because of this fact the flux flowing through section 16 is predominantly of the subharmonic frequency and the voltage induced in output winding 18 is chiefly subharmonic voltage. The load is supplied with substantially the same wave shape as appears across capacitor 14, and is effectively in parallel with capacitor 14. It is possible to omit winding 18 and to supply the load across capacitor 14 or across a portion of winding 12.

Capacitor 14 supplies the subharmonic exciting current for core members 16 and 17, although the energy is originally supplied by source 10. The value of capacitor 14 thus determines the flux density to which the core is normally excited at the output frequency. By supplying sufficient capacity to produce a high flux density in the core I am able to obtain a high degree of stability of operation. Because of the non-linear magnetization characteristic of a magnetic core operated at a high flux density, a small decrease in the flux density in section 16 below its normal value releases a considerable excess of exciting current from capacitor 14 which is then available to supply the load, or to compensate for any decrease in permeability produced by a change in the voltage of source 10.

If the oscillations are stopped by an overload on winding 18 the relay 19 will release, restarting the oscillations automatically.

In Figure 2 the output winding 18 is on core member 16 as in Figure 1, but winding 12 is omitted. Capacitor 14 is connected across windings 11 and 13 in series, with the source 10 being connected across only a portion of winding 11 through tap 22, and with the relay contacts 20 connected across only a portion of winding 13 through tap 21. The purpose of tap 21 is to set the voltage across the relay contacts 20 when they are open at a valve consistent with the design of the relay.

By making winding 11 a high-voltage winding and connecting source 10 to the low-voltage tap 22, the voltage across capacitor 14 is stepped up to a value permitting the use of an economical size of capacitor.

Winding 13 may be made with approximately the same number of turns as winding 11 and the two windings in series are connected in series opposition with respect to the flux of the frequency of source 10, to reduce the voltage from source 10 which is applied to capacitor 14.

When winding 11 and winding 13 have substantially the same number of turns, the operation of the circuit of Figure 2 is substantially the same as the operation of the circuit of Figure 1 as already described. The similarity between the two arrangements is recognized when it is observed that in Figure 2 the voltage applied to capacitor 14 is induced by the difference between the flux in section 15 and the flux in section 17, which is substantially the same as the flux in section 16. In Figure 1 the voltage across capacitor 14 is also induced by the flux in section 16.

It is not necessary to make windings 11 and 13 in Figure 2 exactly equal, but their relationship may be altered to control the voltage from source 10 which is applied to capacitor 14 and also to control the voltage of the frequency of source 10 which is induced in output winding 18.

In Figure 2 better use is made of winding 13, which in Figure 1 is used only in starting the oscillations and thereafter remains idle.

The circuit of Figure 3 is a combination of the arrangements of Figures 1 and 2, in which capacitor 14 is supplied with subharmonic voltage from winding 12, as in Figure 1, and also with voltage from windings 11 and 13 in series, as in Figure 2. Thus the circuit operation is substantially as previously described, with the flux through core section 16 being predominantly of the subharmonic frequency, the flux through section 15 being predominantly of the frequency of source 10, and the flux through section 17 being the combination of the two. Capacitor 14 supplies the exciting current of the subharmonic frequency as in the previous figures. Windings 16 and 17 are connected in series addition with respect to the flux of the subharmonic frequency which flows through core members 16 and 17.

Several advantages are obtained with the circuit of Figure 3; by making the best use of the coils on all three core sections it is possible to design the coils to utilize all the winding space advantageously, and by connecting in series addition the windings which supply subharmonic voltage to capacitor 14, the voltage in each winding can be lower. Thus winding 13 can have fewer turns than in Figure 2 and consequently the total number of turns on winding 11 can be reduced. In some cases the tap 22 in Figure 3 may be omitted and the lead from source 10 connected to the bottom of winding 11, as in Figure 1.

Saturable inductance 23 in series with capacitor 14 introduces harmonics in the voltage induced in output winding 18. This arrangement may be used when the frequency changer is used to supply ringing power for a telephone system, in which case the added harmonics in the output provide reverting tone which is ordinarily used to inform the individual making a call that the telephone bell of the called party is being rung.

Capacitor 24 in Figure 3 is connected in series with output winding 18 and the load to protect the frequency changer against overloads. With this capacitor in series in the output circuit, overloads will not ordinarily cause the oscillations to stop as may sometimes occur with the circuits of Figures 1 and 2. When a continued overload is applied to the circuits of Figures 1 and 2 the repeated operations of the relay 19 may cause damage to the contacts or may overheat the windings whereas with the protecting condenser 24 as used in Figure 3 the relay 19 normally operates only when power from source 10 is first applied or after power interruptions.

It is to be understood that the drawing is diagrammatic in nature and is not intended to represent the proportions of the magnetic core, and although core sections 16 and 17 are shown substantially alike, this merely represents one possibility and other proportions may sometimes be preferred. Other core configurations may be used without departing from the true scope of my invention, in particular it is not essential that the core member common to the two flux paths be centrally located, even though the accompanying drawing for the sake of clarity shows the common portion located between the other two core sections.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A subharmonic generator comprising in combination a magnetic core having first and second saturable magnetic flux paths having a common portion, a first winding on the common portion adapted to be energized by a source of alternating current, a second winding on the first flux path, a relay having normally closed contacts connected across at least a portion of said second winding, a third winding on the second flux path, and a capacitor connected across the third winding, said relay being energized substantially in series with the capacitor.

2. A subharmonic generator comprising in combination a magnetic core having first and second saturable magnetic flux paths having a common portion, a first winding on the common portion adapted to be energized by a source of alternating current, a second winding on the first flux path, a relay having normally closed contacts connected across at least a portion of said second winding, a third winding on the second flux path, and a capacitor connected across the third winding, said relay being energized substantially in series with the capacitor, and output circuit means substantially in parallel with the capacitor.

3. A subharmonic generator comprising in combination a magnetic core having first and second saturable magnetic flux paths having a common portion, a first winding on the common portion adapted to be energized by a source of alternating current, a second winding on the first flux path, a relay having normally closed contacts connected across at least a portion of said second winding, a third winding on the second flux path, and a capacitor connected across the third winding, said relay being energized substantially in series with the capacitor, and output circuit means inductively related to the second flux path.

4. A subharmonic generator comprising in combination a magnetic core having first and second saturable magnetic flux paths having a common portion, first winding means on the core adapted to be energized by a source of alternating current and to magnetize the common portion, second winding means on the core, a capacitor connected to the second winding means supplying subharmonic exciting current for the first and second flux paths, and a relay producing a starting transient to charge the capacitor and thereby initiate subharmonic oscillations through the second winding means.

5. A subharmonic generator comprising in combination a magnetic core having first and second saturable magnetic flux paths having a common portion, first winding means on the core adapted to be energized by a source of alternating current and to magnetize the common portion, second winding means on the core, a capacitor connected to the second winding means supplying subharmonic exciting current for the first and second flux paths, and a relay producing a starting transient to charge the capacitor and thereby initiate subharmonic oscillations through the second winding means, and output circuit means substantially in parallel with the capacitor.

6. A subharmonic generator comprising in combination a magnetic core having first and second saturable magnetic flux paths having a common portion, first winding means on the core adapted to be energized by a source of alternating current and to magnetize the common portion, second winding means on the core, a capacitor connected to the second winding means supplying subharmonic exciting current for the first and second flux paths, and a relay producing a starting transient to charge the capacitor and thereby initiate subharmonic oscillations through the second winding means, and output circuit means inductively related to the second flux path.

7. A frequency changer adapted to be energized by a source of alternating current and to supply a load with voltage of an output frequency which is one-third the source frequency, comprising in combination, a capacitor, a magnetic core having first and second saturable magnetic flux paths having a common portion, first winding means on the core adapted to magnetize the common portion when energized by said source, second winding means on the either first or second saturable flux path, the capacitor connected to said second winding means and supplying exciting current of said output frequency to magnetize the saturable flux path, and means for starting said exciting current through the capacitor.

8. A frequency changer adapted to be energized by a source of alternating current and to supply a load with voltage of an output frequency which is one-third the source frequency, comprising in combination, a capacitor, a magnetic core having first and second saturable magnetic flux paths having a common portion, first winding means on the core adapted to magnetize the common portion when energized by said source, second winding means on the either first or second saturable flux path, the capacitor connected to said second winding means and supplying exciting current of said output frequency to magnetize the saturable flux path, and means for starting said exciting current through the capacitor, and output circuit means inductively related to the second flux path.

9. A frequency changer adapted to be energized by a source of alternating current and to supply a load with voltage of an output frequency which is a subharmonic of the source frequency, comprising in combination a magnetic core having first and second similar saturable magnetic flux paths with a common portion, first winding means on the core adapted to magnetize the common portion when energized by the source, second winding means on the core adapted to magnetize the first and second flux paths, a capacitor connected across said second winding means, starting means adapted to produce a starting transient to initiate subharmonic oscillations in the second winding means, and output circuit means inductively related to the second flux path.

10. A frequency changer adapted to be energized by a source of alternating current and to supply a load with voltage of an output frequency which is a subharmonic of the source frequency, comprising in combination a magnetic core having first and second saturable magnetic flux paths with a common portion, first winding means on the core adapted to magnetize the common portion when energized by the source, second winding means on the core adapted to magnetize the first and second flux paths, a first capacitor connected across said second winding means, starting means adapted to produce a starting transient to initiate subharmonic oscillations in the second winding means, and output circuit means inductively related to the second flux path, and a second capacitor connected in series with said output circuit means and the load.

11. A frequency changer adapted to be energized by a source of alternating current and to supply a load with voltage of an output frequency which is a subharmonic of the source frequency, comprising in combination a magnetic core having first and second saturable magnetic flux paths with a common portion, first winding means on the core adapted to magnetize the common portion when energized by the source, second winding means on the core adapted to magnetize the first and second flux paths, a first capacitor connected across said second winding means, starting means adapted to produce a starting transient to initiate subharmonic oscillations in the second winding means, and output circuit means inductively related to the second flux path, and a second capacitor connected in series with said output circuit means and the load, and a saturable inductance in series with the first capacitor for introducing harmonics in the load voltage.

12. A static frequency reducer adapted to be energized by a source of alternating current, comprising a magnetic core having first and second magnetic flux paths with a common portion, a first winding on the common portion, at least a part of the first winding being adapted to be energized from said source, a second winding on the first flux path, a third winding on the second flux path, a capacitor, a relay having normally closed contacts connected across at least a portion of the second winding and having an energizing coil connected in series with the capacitor, and output circuit means inductively related to the second flux path for supplying the reduced frequency to a load, the second and third windings being connected in series addition with respect to flux of the reduced frequency, the first and second windings being connected in series opposition with respect to voltage of the energizing frequency, the capacitor being connected across the first, second, and third windings in series.

13. A static frequency reducer adapted to be energized by a source of alternating current, comprising a magnetic core having first and second magnetic flux paths with a common portion, a first winding on the common portion, at least a part of the first winding being adapted to be energized from said source, a second winding on the first flux path, a third winding on the second flux path, a capacitor, a relay having normally closed contacts connected across at least a portion of the second winding and having an energizing coil connected in series with the capacitor, the second and third windings being connected in series addition with respect to flux of the reduced frequency, the first and second windings being connected in series opposition with respect to voltage of the energizing frequency, the capacitor being connected across the first, second, and third windings in series.

14. A static frequency reducer adapted to be energized by a source of alternating current, comprising a magnetic core having first and second magnetic flux paths with a common portion, a first winding on the common portion, at least a part of the first winding being adapted to be energized from said source, a second winding on the first flux path, a capacitor, a relay having normally closed contacts connected across at least a portion of the second winding and having an energizing coil connected in series with the capacitor, and output circuit means inductively related to the second flux path, the first and second windings being connected in series opposition with respect to voltage of the energizing frequency, the capacitor being connected across the first and second windings in series.

15. A frequency changer adapted to be energized by a source of alternating current and to supply a load with voltage of an output frequency which is one-third the source frequency, comprising in combination, a capacitor, a magnetic core having first and second saturable magnetic flux paths having a common portion, first winding means on the core adapted to magnetize the common portion when energized by said source, second winding means on the either first or second saturable flux path, the capacitor connected to said second winding means and supplying exciting current of said output frequency to magnetize the saturable flux path, and means for starting said exciting current through the capacitor, and output circuit means inductively related to the first flux path.

HENRY M. HUGE.